US005213870A

United States Patent [19]

Yamamoto

[11] Patent Number: 5,213,870

[45] Date of Patent: May 25, 1993

[54] BENDABLE ORNAMENTAL PANEL

[76] Inventor: Akio Yamamoto, 1062-banchi, Kyoden, Fukui-shi, Fukui-ken, Japan

[21] Appl. No.: 604,473

[22] Filed: Oct. 29, 1990

[51] Int. Cl.[5] ........................ B32B 3/00; A47G 35/00; B44F 7/00

[52] U.S. Cl. ........................................ 428/172; 428/68; 428/81; 428/99; 428/156; 428/157; 428/161; 428/167; 428/192; 428/213; 428/542.2; 52/312; 52/465

[58] Field of Search ...................... 428/156, 542.2, 192, 428/167, 213, 83, 344, 172, 81, 913.3, 33, 57, 66, 68, 99, 120, 157, 161; 52/311, 312, 459, 465, 716

[56] References Cited

U.S. PATENT DOCUMENTS 390,945 10/1888 Bosley ................................ 428/167
2,681,377 6/1954 Smithers ............................. 428/167
3,746,607 7/1973 Harmon et al. ..................... 428/167
4,816,316 3/1989 Robbins .............................. 428/167

*Primary Examiner*—Donald J. Loney
*Attorney, Agent, or Firm*—Edwin E. Greigg; Ronald E. Greigg

[57] ABSTRACT

A bendable ornamental panel is constructed by connecting the edge portions of thick portions and intermediate thin portions in order and the angle $\theta$ between the side surface of a base portion of the thick portion and the thin portion is set to be between 80 degrees and 130 degrees. The reverse side of the thick portion and that of the thin portion is formed in a plane. A side end thin portion having flexibility is connected to the outside end edge portion of one of the side end thick portions. The thickness of the side end thin portion is formed relatively thick at the base portion and formed gradually thin from the base portion to the tip end portion.

4 Claims, 15 Drawing Sheets

BENDABLE ORNAMENTAL PANEL

BACKGROUND OF THE INVENTION (1) Field of the Invention

The present invention relates to a bendable ornamental panel which is attached to a front side of a base member so as to easily form a plane facing, a bend facing, a curve facing or a facing formed in combination thereof, which provides line-concave and convex portions which make a good show.

(2) Description of the Prior Art

A conventional ornamental panel covers the front side of a base member such as a baseboard, a ceiling cornice, an outside angle member, and an internal angle member, so as to display ornamental effects. However, since shapes or forms of the conventional ornamental panel were determined according to the shape or forms of the corresponding base members, any kind of the ornamental panels should be designed and manufactured independently in order to increase ornamental effects. As the result, its manufacturing and working cost became high and its storing work became complex. Further, since the ornamental panel had poor flexibility, there occurred unbecoming clearances at appearing portions when it is attached to a subject member so that ornamental effects may be reduced.

SUMMARY OF THE INVENTION

The present invention has an object to provide a bendable ornamental panel which may solve the above mentioned problems.

To solve the above mentioned problems, the bendable ornamental panel 1 (called an ornamental panel hereinafter) according to the present invention comprises thick portions 3 having edge portions 4 at the base portion thereof and side surfaces 10 at the base portion thereof, thin portions 5 having flexibility for connecting the thick portions to one another, the side surface 10 of the base portion of the thick portion 3 and the thin portion being formed to have an angle $\theta$ between 80 degrees and 130 degrees, the reverse sides of the thick portion and the thin portion being formed plane, and a side end thin portion 7 having flexibility and connected to the outside edge portion of one of the thick portions 3A and 3B located at the side ends thereof, the side end thin portion 7 being formed relatively thick at a base portion 8 thereof and gradually thinner from the base portion 8 to a tip end 9 thereof.

In the above mentioned wording, the wording of "the side surface 10 of the base portion of the thick portion 3 and the thin portion being formed to have an angle $\theta$ between 80 degrees and 130 degrees" means that the angle between the flat side surface 10 and the thin portion is set to be between 80 degrees and 100 degrees in such a case that the side surface 10 of the base portion is plane, and that the angle $\theta$ between the thin portion and a tangential line l of the curved connecting portion between the thick portion and thin portion is set to be between 80 degrees to 130 degrees in such a case that the side surface of the base portion is curved.

It is preferable to set the angle $\theta$ to be 100 degrees to 130 degrees, since it is easier to wipe away the dust in the grooves formed with the thick portions.

To increase ornamental effects, it may attach a lustrous tape member 35 to a desired thick portion.

To give an accent to the ornamental panel by further increasing a thickness of the thick portion, it may attach a thick cover to a desired thick portion.

The side end thinner portion 7 is formed gradually thin from the base portion 8 to the tip end portion 9 by tapering the front side or the reverse side thereof.

The present invention has the following advantages.

(1) The ornamental panel according to the present invention is constructed such that a plurality of the thick portions are connected to one another via each of the thin portions which are flexibile and bendable, and that the angle between the flat surface of the base portion of the thick portion and the thin portion is set to be between 80 degrees and 130 degrees so as to be bendable in keeping a straight line at the side edge portion of the intermediate thick portion.

Therefore, the ornamental panel may be attached to the front surface of a base member in such a state that the ornamental panel is suitably bent at the thick portion thereof. As the result, any facing portion such as a plane facing, a bend facing, a curve facing or a complex facing combining these facing, may be easily made to one that is a continuous concave and convex portion. Thus, the ornamental panel according to the present invention is superior for various purposes and in practicing the same.

(2) The ornamental panel according to the present invention provides a thin portion with an outside base edge portion of one of the thick portions located at both ends thereof. The thin portion has flexibility and is tapered to be slender. Therefore, where a surface (such as a floor) crossing a base member (such as a baseboard) has unevenness, the thin portion may smoothly be bent for a necessary distance from the tip end thereof according to the unevenness of the crossing surface. At the time, returning resilient force of the thin portion becomes large as the bending from the tip end of the thin portion progresses. Therefore, it becomes possible to prevent a unsuitable clearance occurring between the ornamental panel and the surface crossing the base member so as to make a good show.

(3) The ornamental panel according to the present invention provides the side end thin portions and the intermediate thin portions, which are formed thin.

Accordingly, the tip end of the side end thin portion of one ornamental panel may be contacted with the base edge of the thick portion of the side end of another ornamental panel. As the result, the connecting portion may be positioned in a groove and particularly the side edge of the groove. Therefore, the ornamental panels may be connected to one another for a wide area in such a state that the connecting portions do not appear, and as the result, it becomes possible to form a plane facing or a curved facing which makes a good show.

(4) It is possible to give an accent to the ornamental panel formed by attaching a lustrous tape to the desired thin portion. Further, it is possible to give an accent to the ornamental panel or to form the same seriously by fitting the thick increasing cover to the desired thick portion.

(5) Where the angle between the side surface of the base portion of the thick portion and the thin portion is set to be between 100 degrees and 130 degrees, it becomes possible to wipe away a dust in the grooves.

Other advantages of the present invention will be apparent from the description of the embodiments with reference to the drawings.

BRIEF DESCRIPTION OF THE DRAWINGS

The drawings show suitable embodiments of a bendable ornamental panel according to the present invention in which.

DETAILED DESCRIPTION OF THE EMBODIMENTS

EXAMPLE 1

Figure 1:
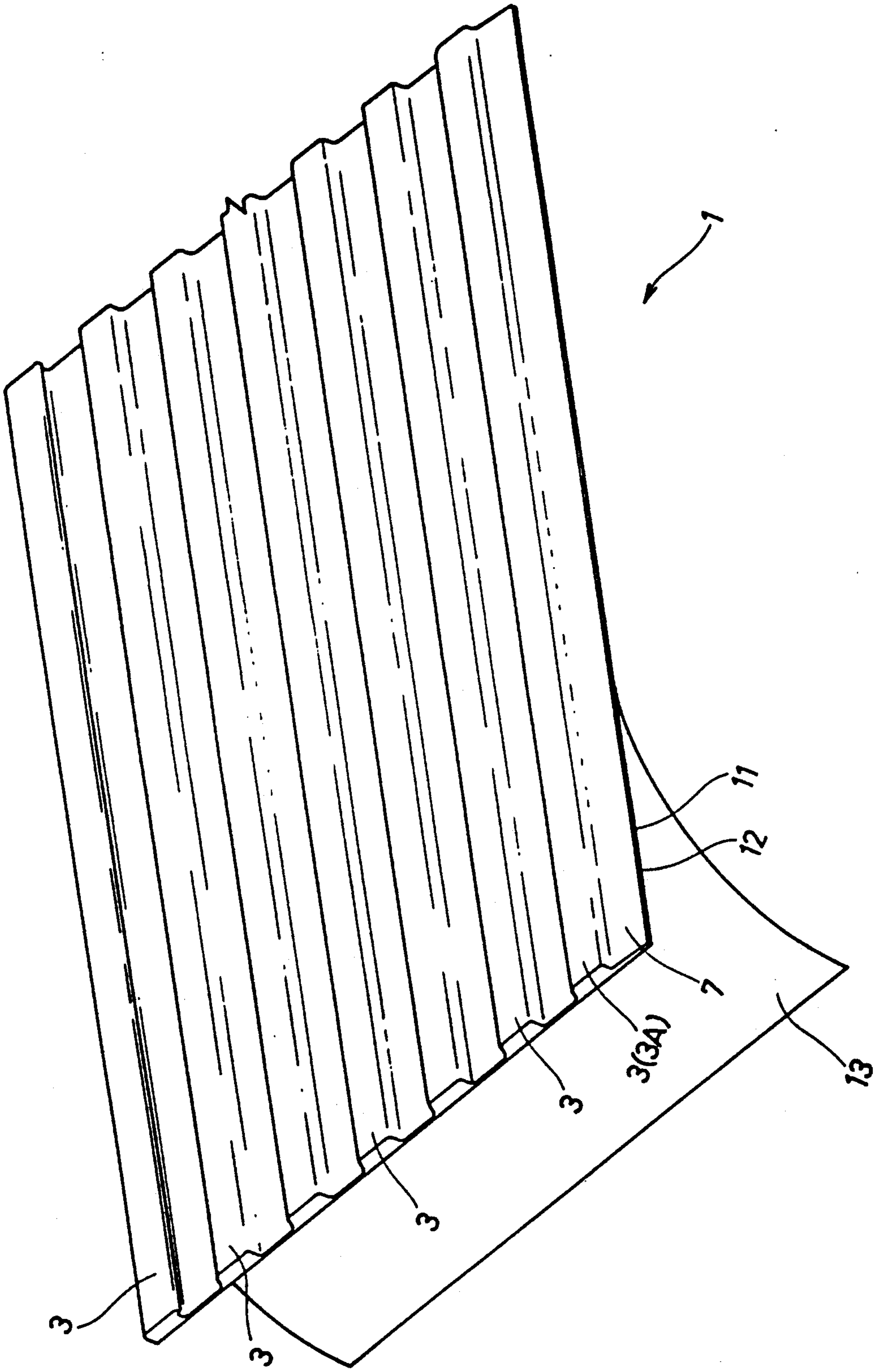
FIG. 1 is a perspective view of an ornamental panel of one embodiment.
Figure 2:
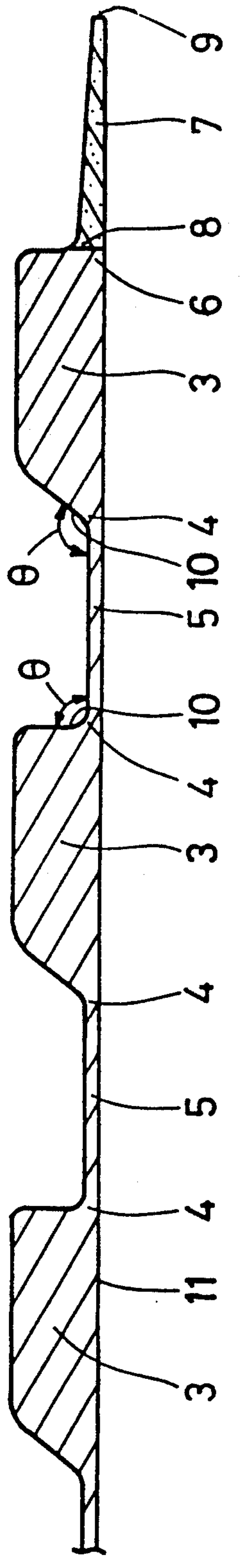
FIG. 2 is a sectional view of FIG. 1.
Figure 3:
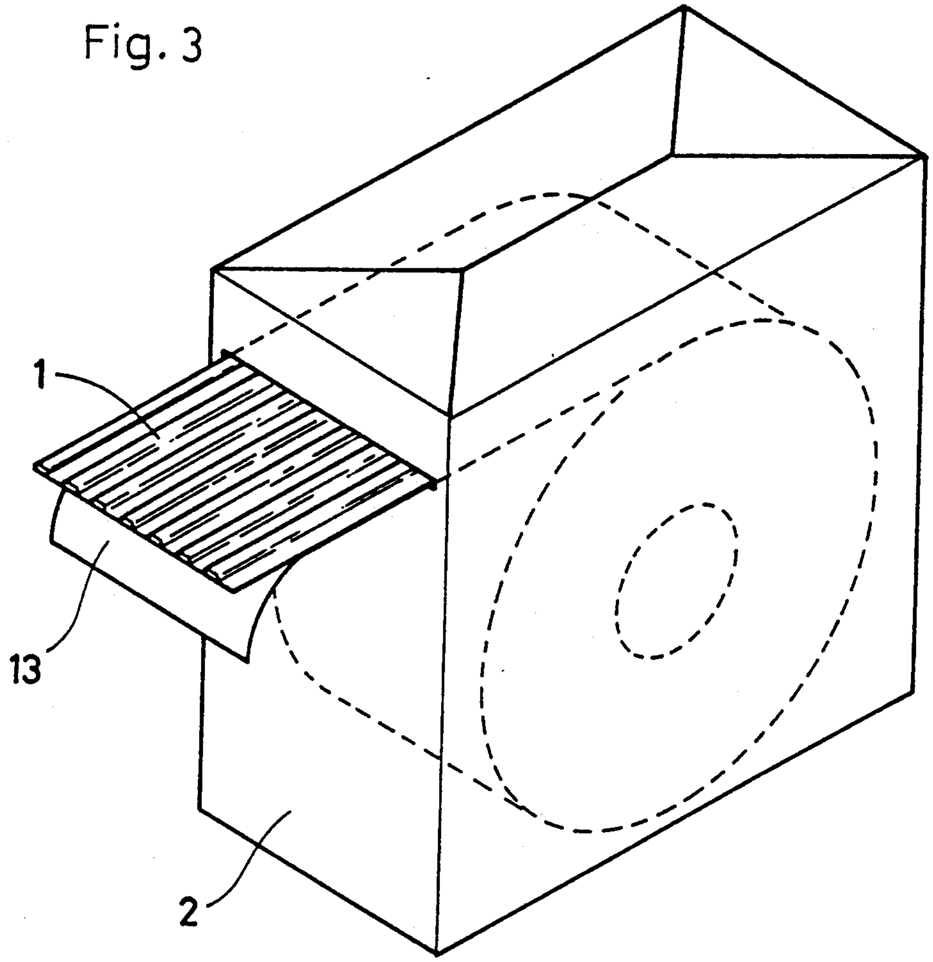
FIG. 3 is a perspective view showing the ornamental panel housed in a box in the state of a roll.

As shown in FIGS. 1 and 2, an ornamental panel 1 according to the present invention is, for instance, formed to be a tape which is windable. As shown in FIG. 3, the ornamental panel 1 is housed in a housing 2 in the state of a roll and it is pulled from the housing 2 for a length necessary for the purpose of its use and cut.

This is described in detail as follows. The ornamental panel 1 is formed integrally in the manner of extrusion of plastics. An intermediate portion 5, which is made of semi-hard plastics or soft plastics, connects each of the edge portions 4 and 4 of the base portions of thick portions 3 and 3 which are adjacent to each other and formed to be slender to have substantially the same size, and which present a rectangular or a trapezoid in cross section. A side end thin portion 7 is attached to an outside base portion 6 of one of the thick portions located at the both ends, for instance, the thick portion 3A. The thin portion 7 is made of soft plastics to have flexibility. The side end thin portion 7 has a tapered front side and a base end portion 8 thereof is formed to relatively be thick and it is formed to be thinner gradually from the base end portion 8 to a tip end 9. An angle $\theta$, which is formed between a flat side surface 10 of the base end portion of the thick portion 3 and the intermediate thin portion 5, is set to be between 80 degrees and 130 degrees. The reverse side of the thick portion and the reverse side of the thin portion is formed plane so as to form a flat reverse side 11 of the ornamental panel 1. A peel-off paper 13 is attached to all of the reverse side 11 or the area except the reverse side of the thin portions 7, by means of an adhesive layer 12.

Figure 4:
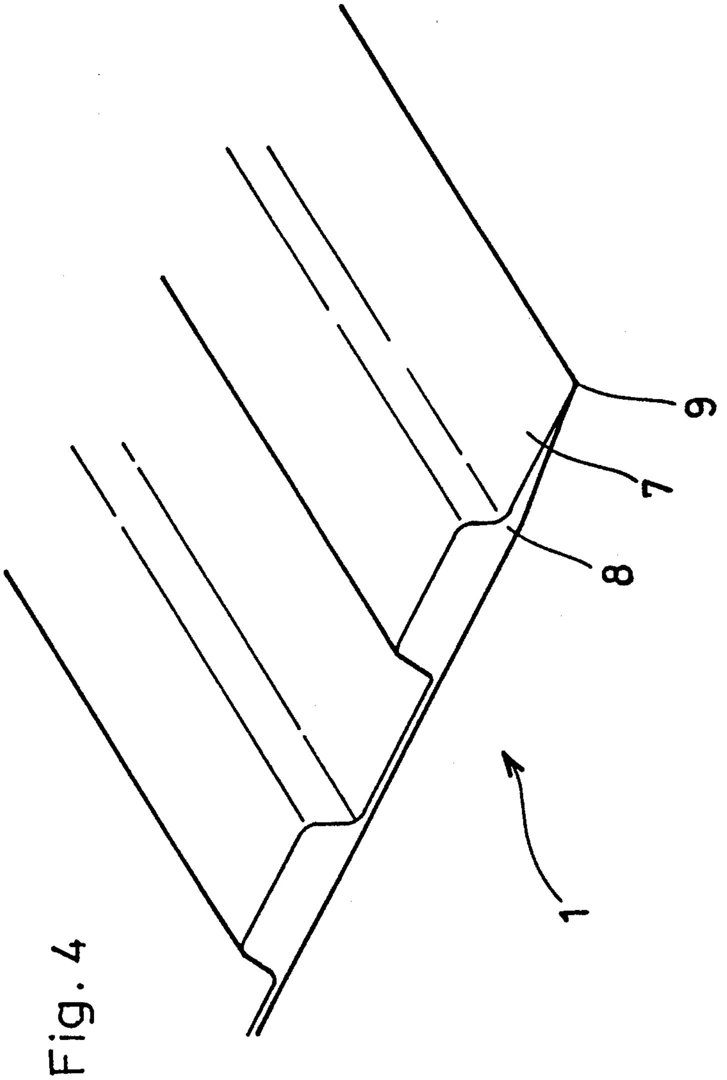
FIG. 4 is a perspective view showing partially the ornamental panel of another embodiment.

FIG. 4 is a perspective view showing a part of an ornamental panel 1 of another example which is provided with a side end thin portion 7 having a reverse side which is formed to be thin gradually from a base end portion 8 to a tip end 9 portion.

The aspect of use of the ornamental panel 1 having the following constructions will be described together with its function.

Figure 5:
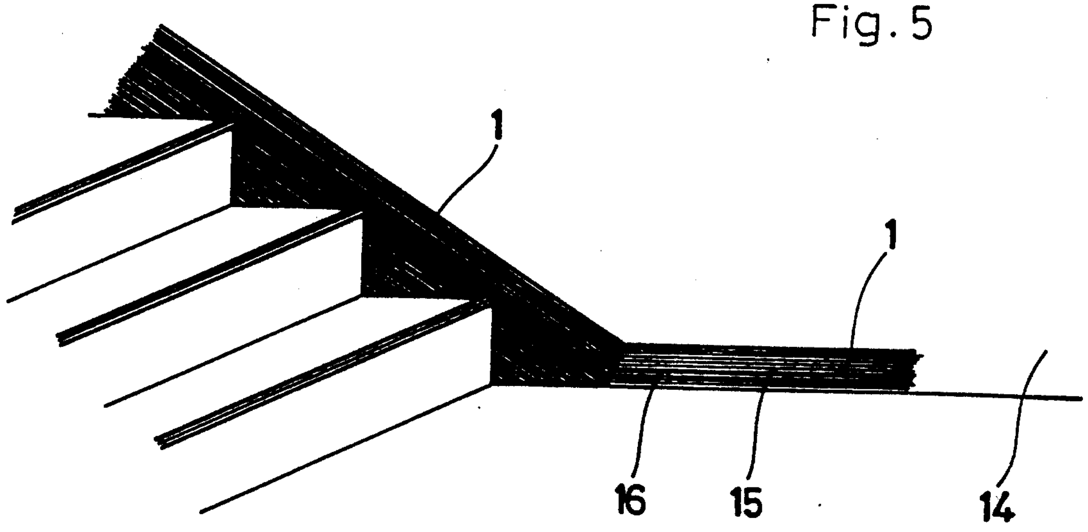
FIGS. 5 through 7 are perspective views showing use of the ornamental panels.
Figure 6:
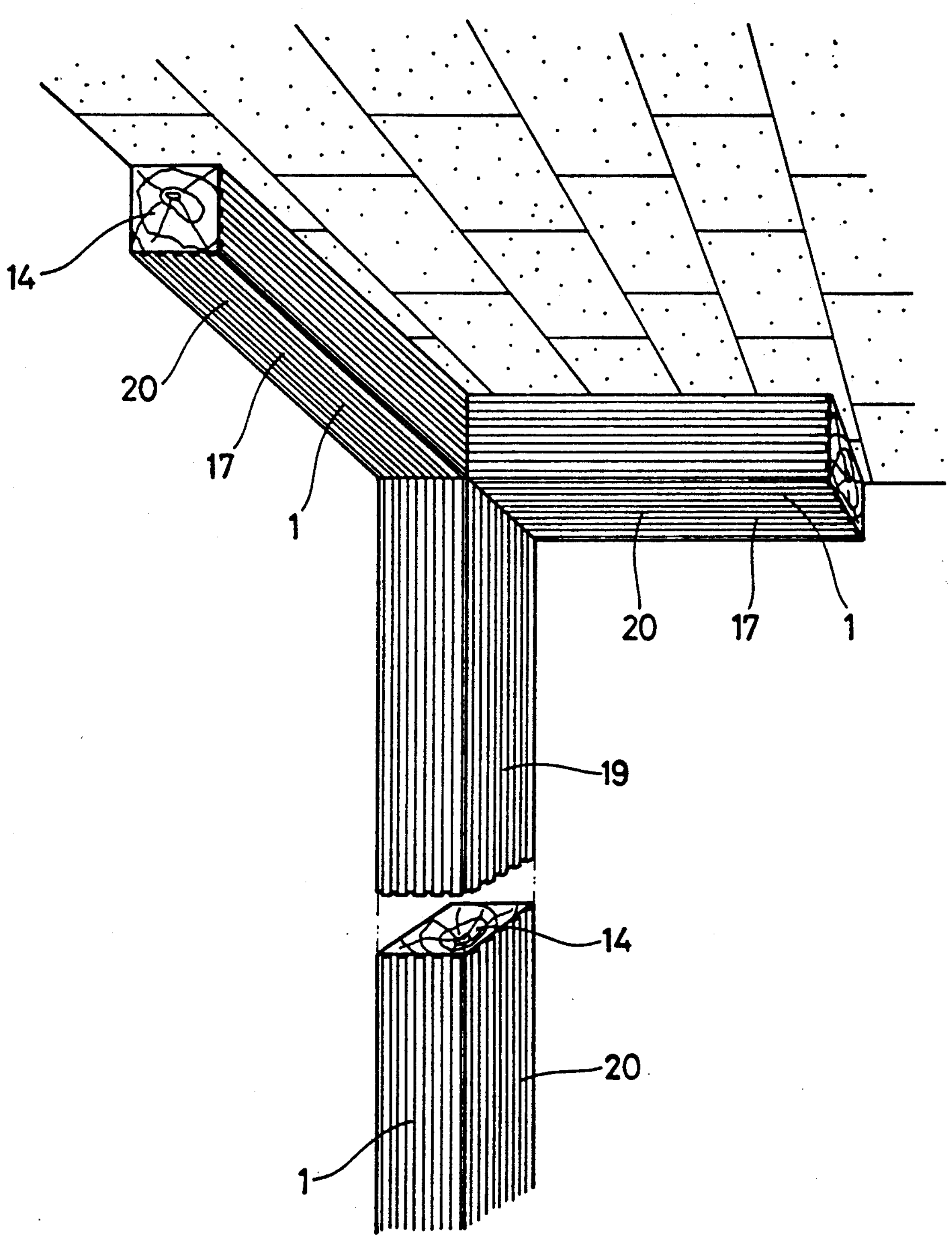
Figure 7:
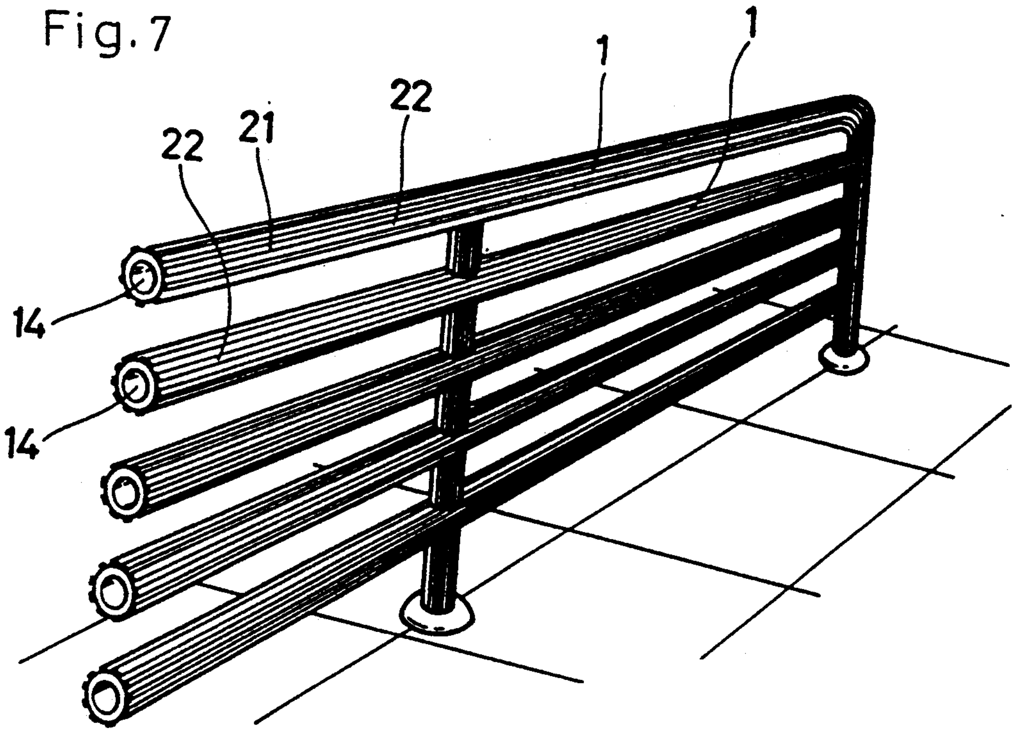

The ornamental panel 1 according to the present invention may be attached to a desired surface portion of a base member 14 in such a state of a plane, curve or bend. Thus, the ornamental panel 1 forms a plane facing 16 such as a mopboard or a base board which provides line-concave and convex portions which is pleasing in appearance (See FIG. 5). The ornamental panel 1 forms a bend facing 20 such as a ceiling cornice 17 or a pillar 19 (See FIG. 6). Further, the ornamental panel 1 forms a curve facing 22 such as a handrail 21 (See FIG. 7).

Figure 8:
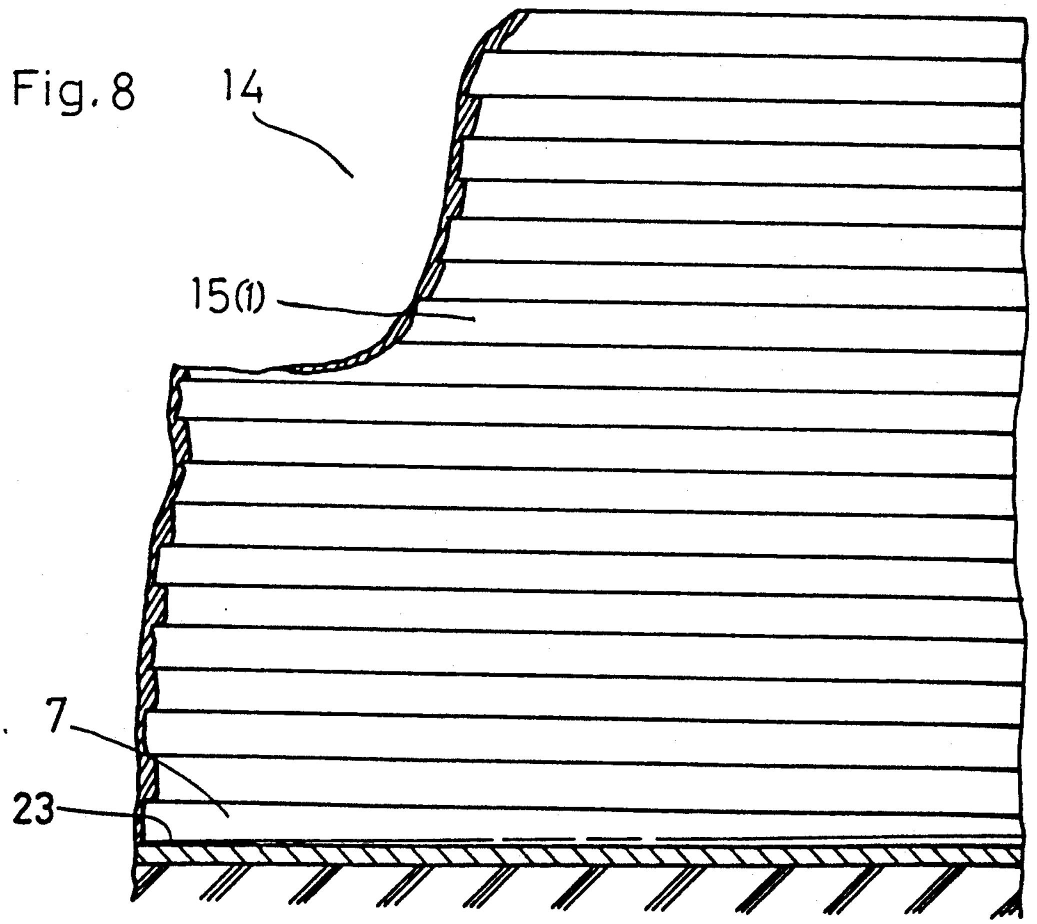
FIG. 8 is a front view of the ornamental panel used for a baseboard.
Figure 9:
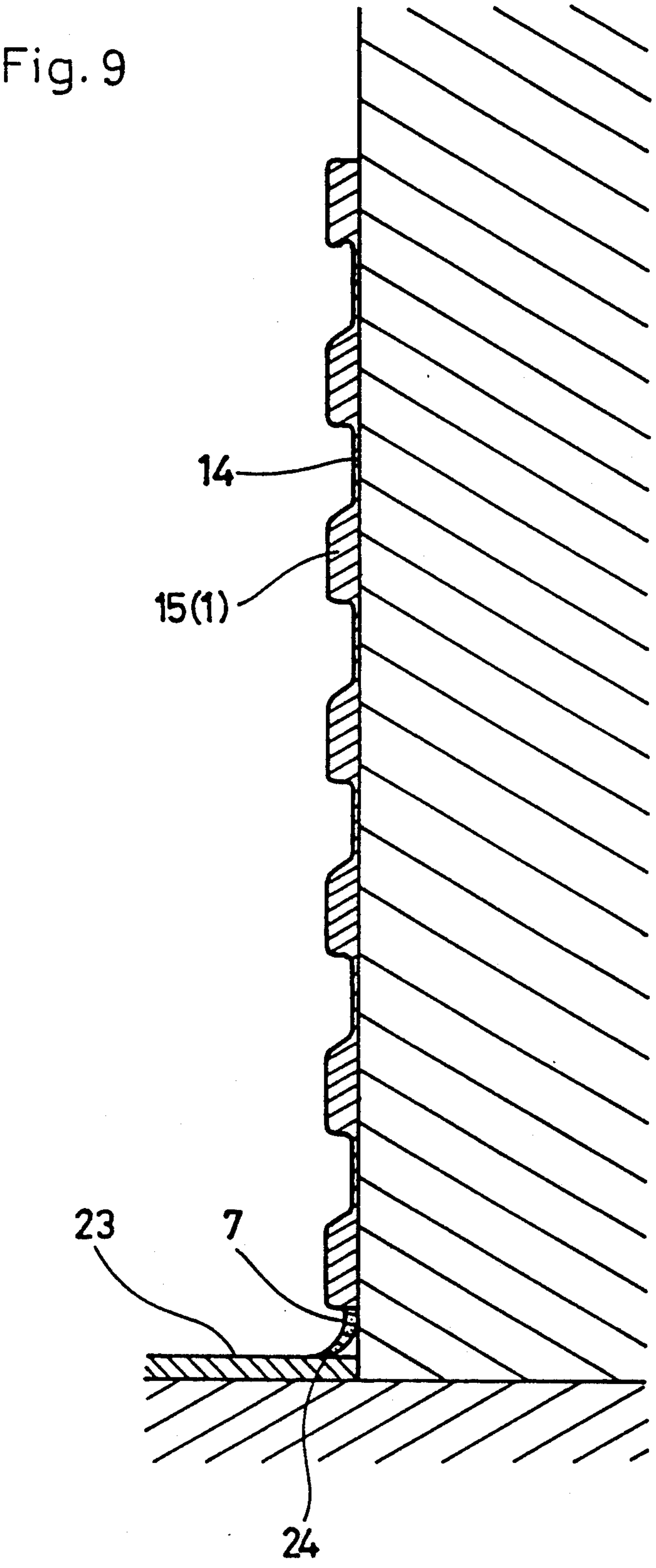
FIGS. 9 through 12 are sectional views of the ornamental panels for describing functions of each of the side end thin portions.
Figure 10:
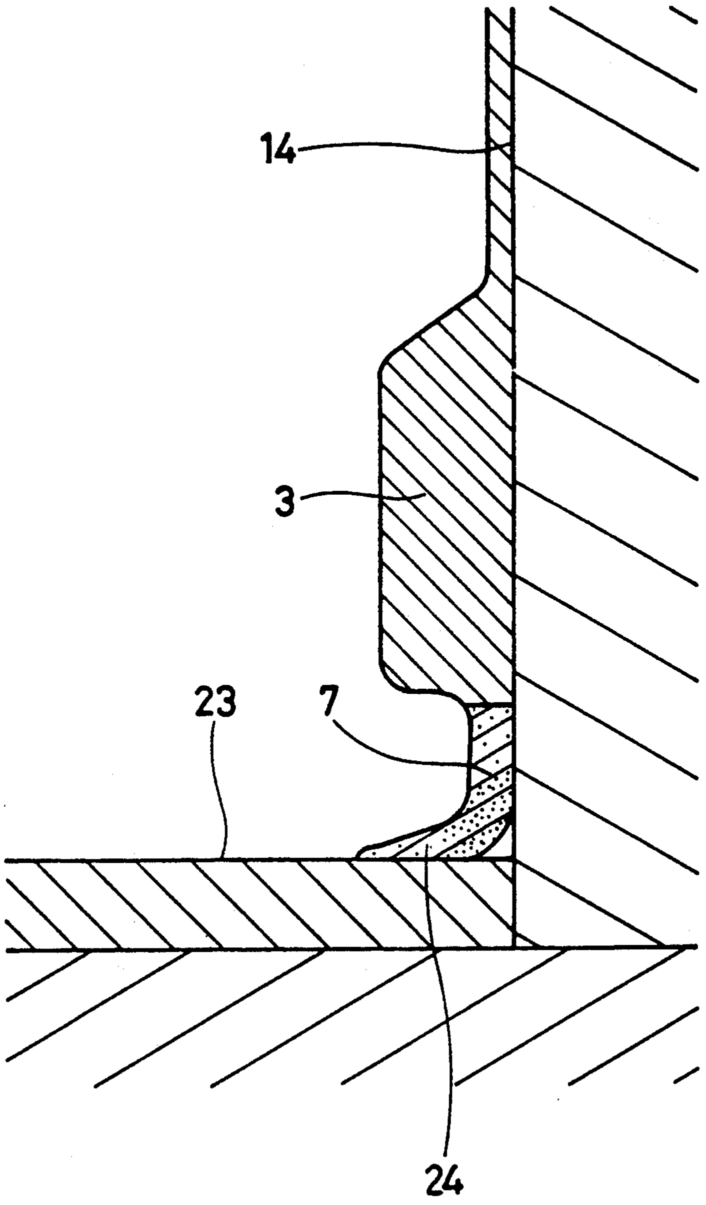
Figure 11:
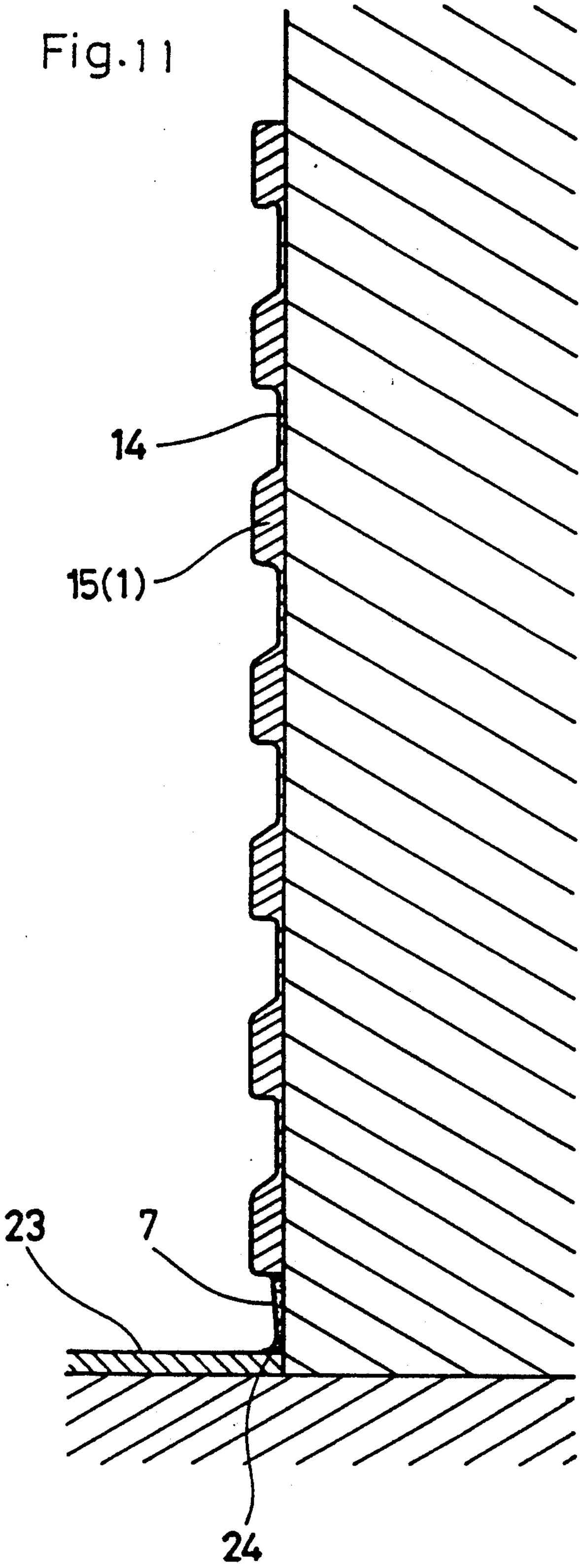
Figure 12:
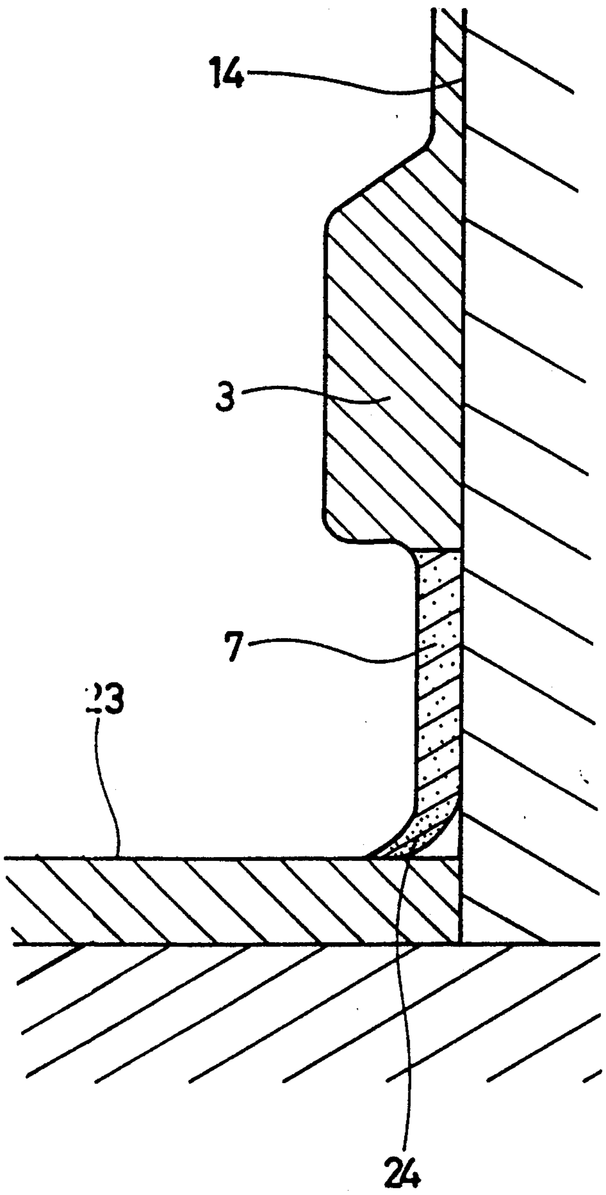
Figure 13:
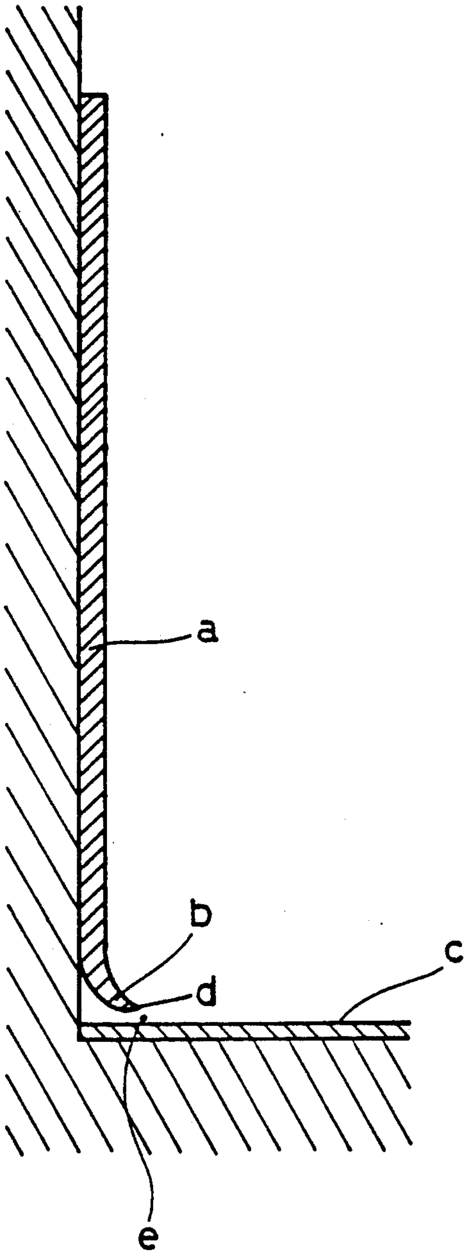
(Prior Art) Fig.13
FIG. 13 is a sectional view of use of a conventional baseboard of hard plastics.

FIGS. 8 through 12 show sectional views of the ornamental panel 1 according to the present invention where it is used as a base board. The ornamental panel 1 is attached to a base member (wall) in such a state that the tip end portion of the side end thin portion 7 is pressed on a floor 23. At the time, the resilient returning force of the side end thin portion 7 becomes large as bending of the tip end of the thin portion 7 progresses since the side end thin portion 7 is formed to be thick gradually from the tip end portion 9 to the base end portion 8. As the result, the side end thin portion 7 may be bent or curved smoothly for a necessary distance from the tip end according to unevenness of the floor 23, as shown in FIGS. 9 and 10 (FIG. 9 is an enlarged sectional view of a right end of the base board 15 of FIG. 8 and FIG. 10 is an enlarged view of a lower end of FIG. 9.), or in FIGS. 11 and 12 (FIG. 11 is an enlarged sectional view of an intermediate portion of the base board 15 of FIG. 8 and FIG. 12 is an enlarged view of a lower portion of FIG. 11). Therefore, where the base board is formed by using the ornamental panel 1 of the present invention, the lower portion 24 of the ornamental panel 1 fits the floor 23 extending a whole length of the panel and it is not afraid to form a clearance unexpectedly between the lower end of the base board and the floor. By the way, in the case of a conventional base board a of plastics as shown in FIG. 13, a lower end portion b of the base board does not bend or curve according to an unevenness of the floor c and therefore such a conventional base board cannot prevent forming of the unsuitable clearance e.

Figure 14:
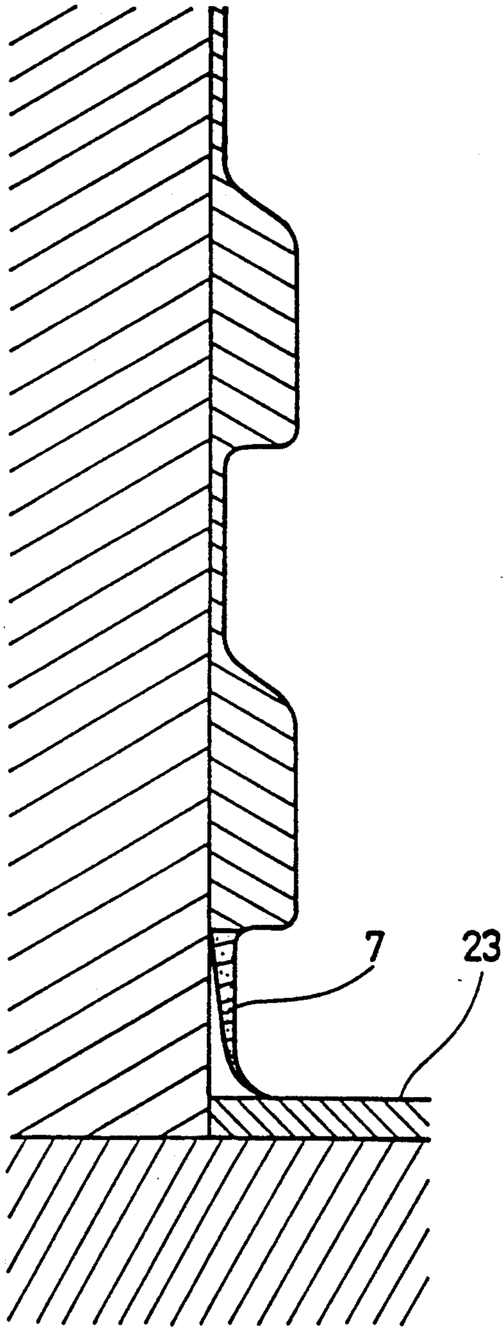
FIG. 14 is a sectional view of the ornamental panel of FIG. 4, for describing functions of the side end thin portion used for a baseboard.

FIG. 14 show an example of the ornamental panel 1 used as a base board, which ornamental panel has a side end thin portion 7 at the end thereof which thin portion has a tapered reverse side. As mentioned hereinbefore, the side end thin portion 7 is bending or curving only for a necessary distance from the tip end thereof according to unevenness of the floor.

Figure 15:
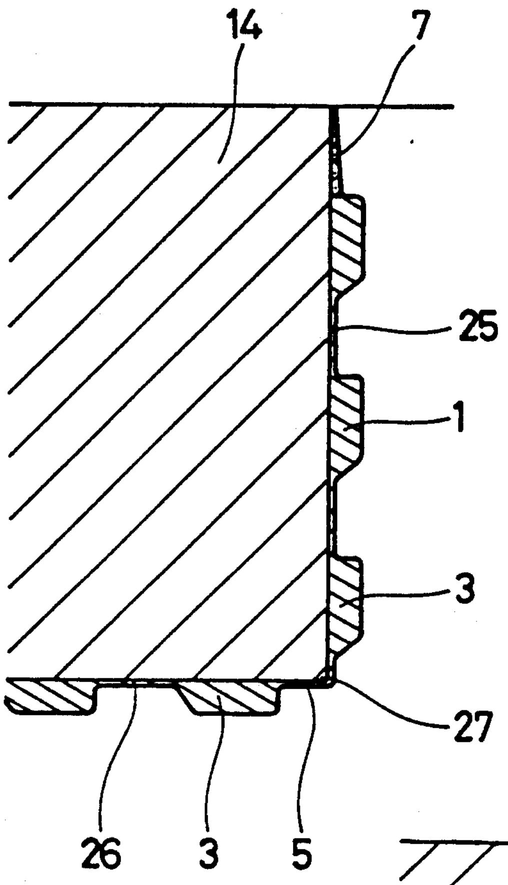
FIGS. 15 through 17 are sectional views showing bending states of the intermediate thin portion.
Figure 16:
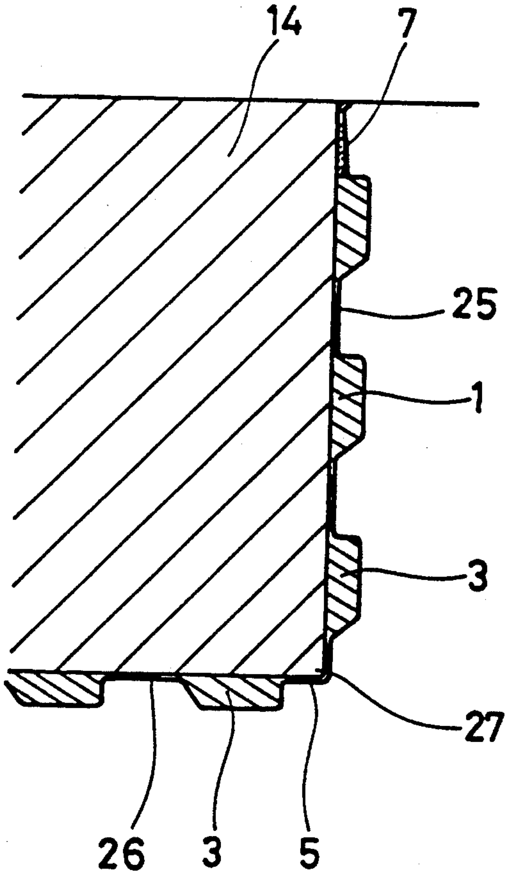
Figure 17:
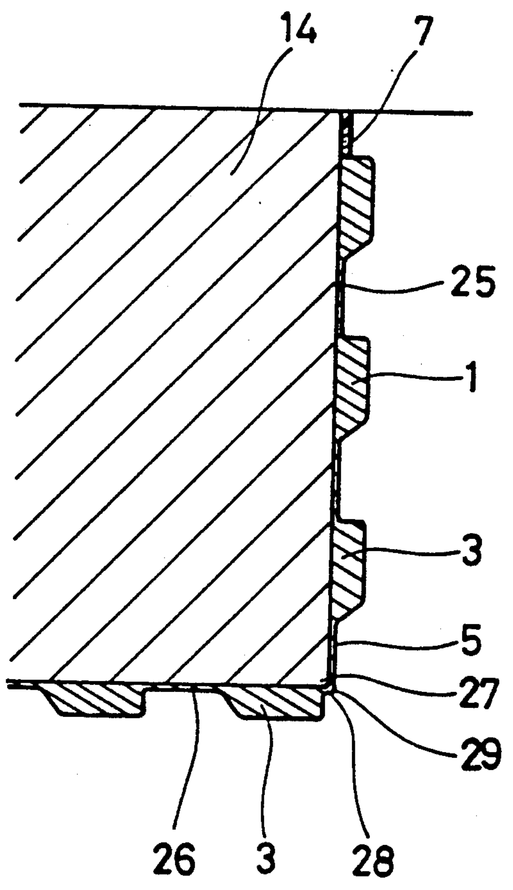
Figure 18:
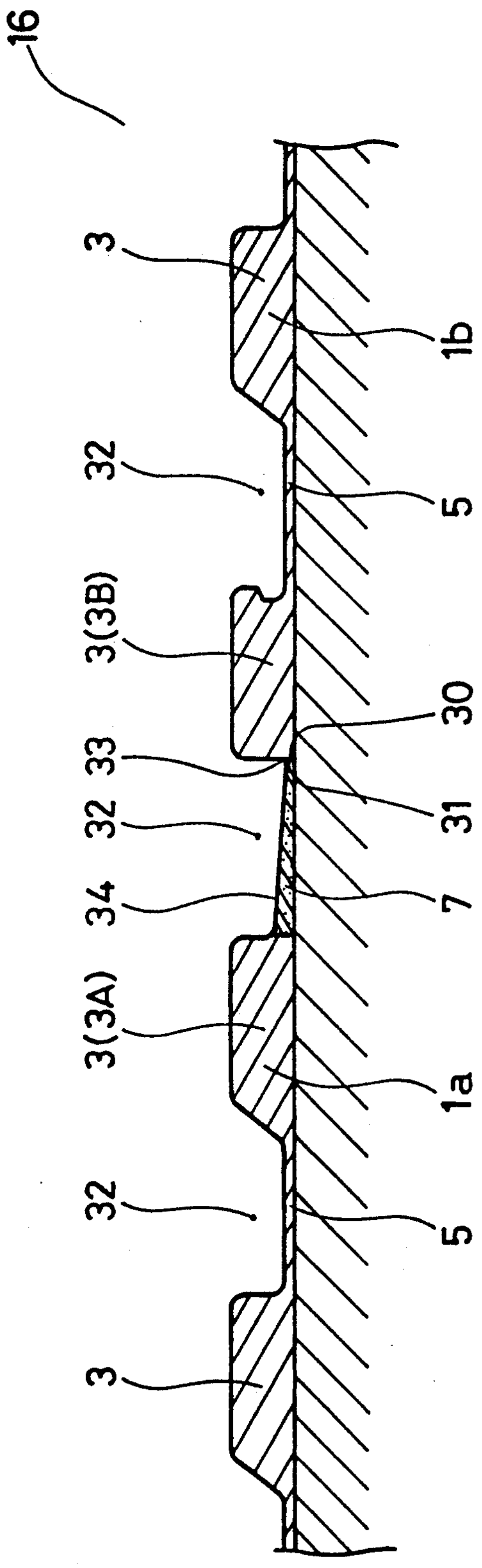
FIG. 18 is a sectional view showing the connecting state of each of the ornamental panels.

FIGS. 15 through 17 show sectional views of the ornamental panel 1 of this embodiment which is used as a ceiling cornice. The ornamental panel 1 is bendable at a desired portion of the intermediate thin portion 5 having flexibility and therefore when the ornamental panel 1 is adhered to a side portion 25 and a reverse side portion 26 of a ceiling cornice member 14, any portion (a middle portion or a side end portion) of the intermediate thin portion 5 may surely correspond to a corner portion 27 of the ceiling cornice member 14 by bending the tip end portion of the side end thin portion 7 (FIG. 16) or by cutting the width of the side end thin portion 7 to be a suitable one (FIG. 17). Accordingly, the ornamental panel 1 may be bent or curved at the intermediate thin portion 5 as it looks nice. Where the description of bending or curving of the side end portion is supplemented in connection with the ornamental panel 1 according to the present invention, the ornamental panel 1 may be bent in such a state that a straight line of the bent portion 29 is kept as shown in FIG. 17, even if a side edge portion 28 of the intermediate thin portion 5 corresponds to the corner portion 27 of the ceiling cornice member 14, since the angle θ between the flat side 10 of the base portion of the thick portion 3 and the thin portion is set to be between 80 degrees and 130 degrees.

Where the ornamental panel according to the present invention is adhered to relatively the wide area. one ornamental panel 1*a* is connected to another ornamental panel 1*b* adjacent thereto so as to contact a tip end portion 30 of a side end thin portion 7 with a base end edge 31 of a thick portion 3B of another ornamental panel, as shown in FIG. 18. In such a state of connection, since the width of the side end thin portion 7 located at the side end of the ornamental panel 1 and that of the intermediate thin portion 5 are substantially equal to the width of the thick portion 3, all of grooves 32 formed between the thick portions 3 which are adjacent to one another, present substantially the same width. Further, connection portions 33 are located at the side edges of groove bottoms 34, the connecting portions 33 are not conspicuous. Therefore, the whole of the ornamental panel is finished as the plane facing 16 having an appearance of one body. This advantage may be realized in such a case that a curve facing and the like are formed by connecting plural ornamental panels to one another.

OTHER EXAMPLES

Figure 19:
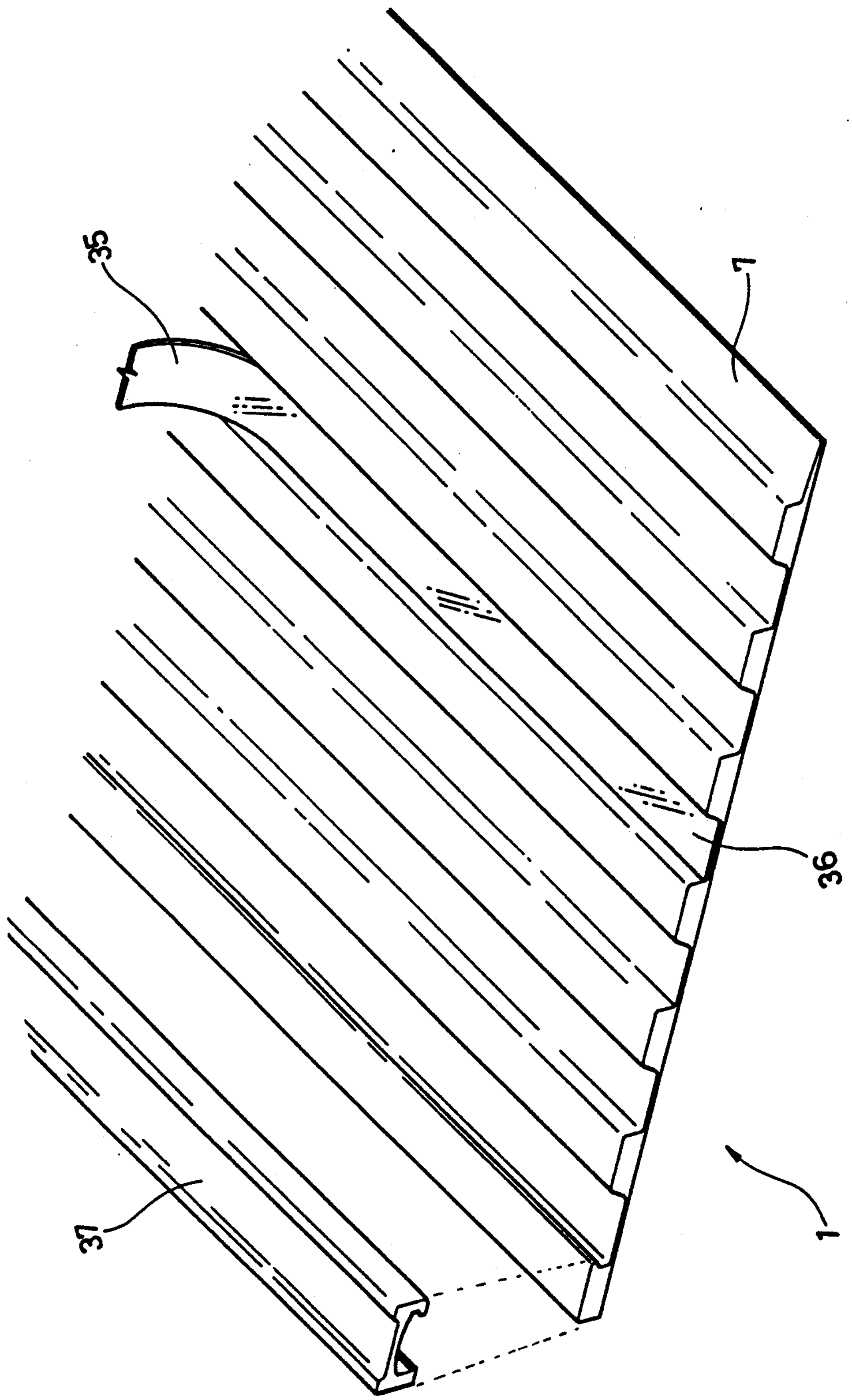
FIG. 19 is a perspective view of the ornamental panel showing that a lustrous tape member is adhered to the ornamental panel, together with a thick increasing cover.
Figure 21:
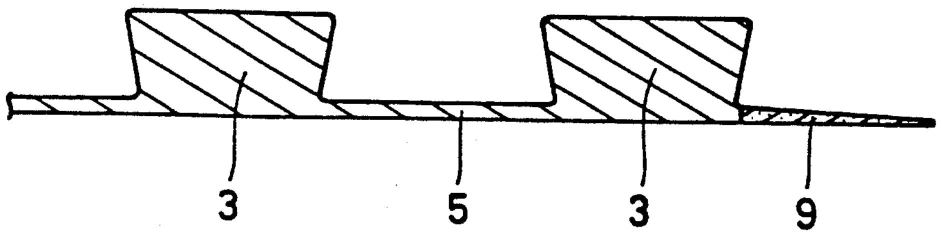
FIGS. 21 through 24 are sectional views showing a part of each of the ornamental panels of another embodiment according to the present invention.
Figure 22:
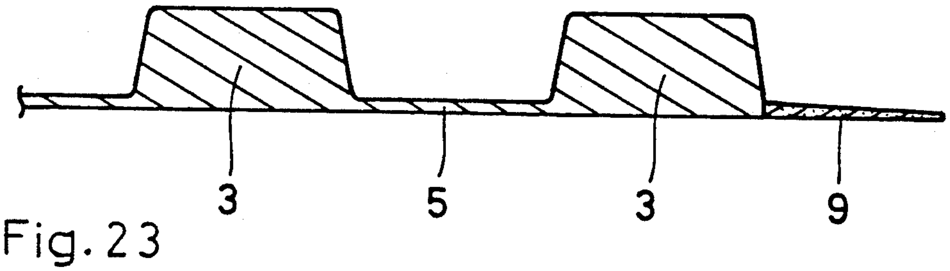
Figure 23:
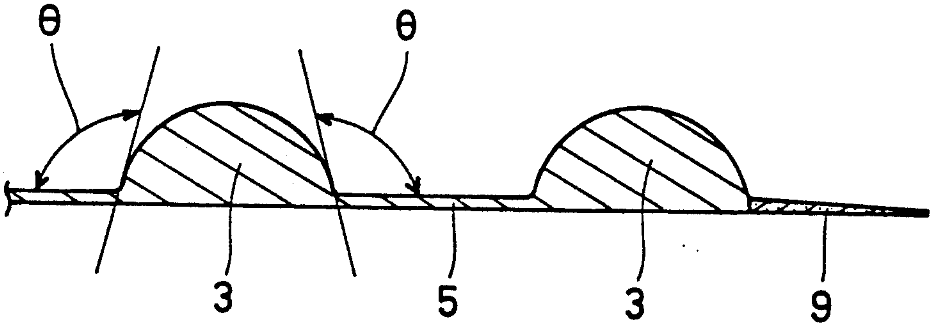
Figure 24:
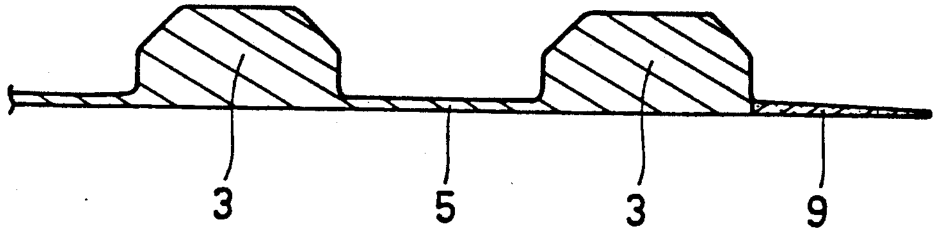

As shown in FIG. 19, when a lustrous tape member 35 is adhered to the desired thin portion, a linear lustrous portion 36 formed by the tape member 35 gives an accent to the ornamental panel 1.

Where a thick increasing cover 37 is engaged with or adhered (if necessary) to a desired thick portion of the ornamental panel 1, as shown in FIG. 19, it forms the ornamental panel having seriousness and gives a further accent to the ornamental panel.

Figure 20:
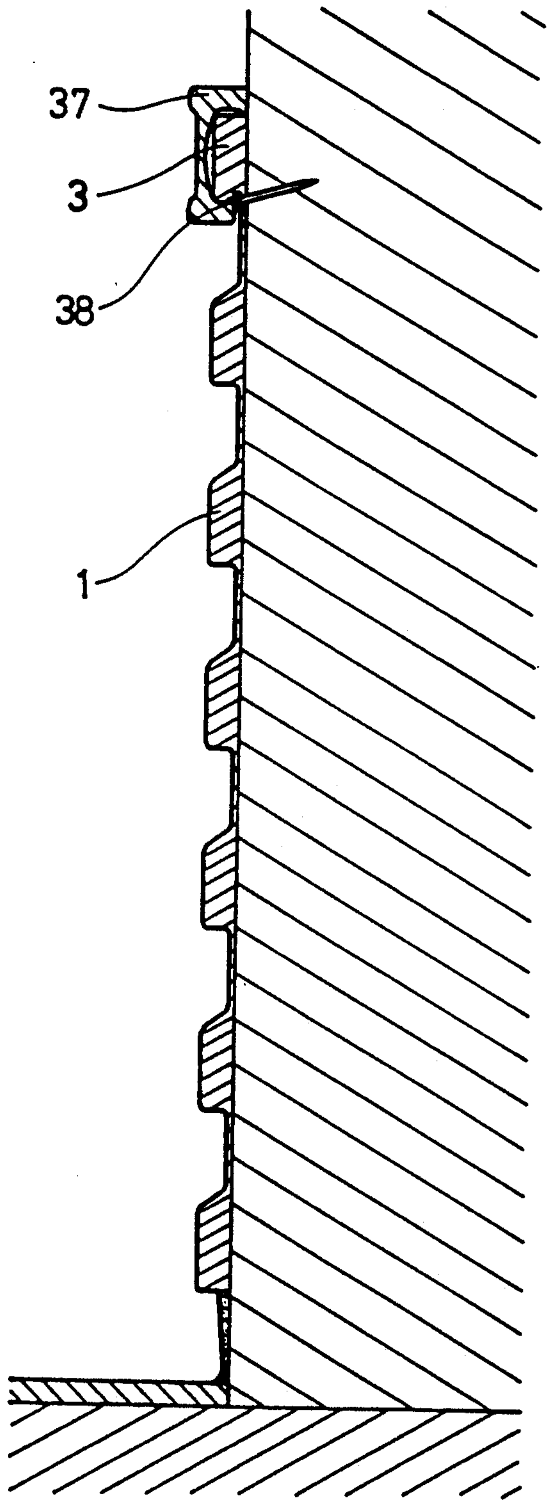
FIG. 20 is a sectional view of the ornamental panel showing that a thick increasing cover is attached to the upper most thick portion of the ornamental panel used for a baseboard.

FIG. 20 shows an example of the ornamental panel used as the base board 15 wherein the thick and big cover 37 is engaged with the upper most thick portion 3. Since the upper end of the base board, which is attractive, is formed thick, the base board may be finished seriously. The thick increasing cover 37 engaged in such a manner, function as a cover for covering a nail head 38 when the ornamental panel 1 is fixed to the base member by means of nails.

Further, according to the present invention, the tip end portion of the thick portion 3 of the ornamental panel 1 may be formed in desired shapes as far as a straight line is kept at the connecting portion between the thick portion and the thin portion when bending, under such a condition that the angle θ between the flat side of the base portion of the thick portion 3 and the thin portion, is set to be a range of about 80 degrees to 130 degrees or that the angle θ between the thin portion and a tangential line l of the curved connecting portion between the thick portion and thin portion, is set to be a range of about 80 degrees to 130 degrees.

FIGS. 21 through 24 show other examples of the thick portion 3 of the ornamental panels according to the present invention together with the thin portion connected thereto.

What is claimed is:

1. A bendable ornamental panel attachable to a base member, said panel comprising:
   - a plurality of thick portions (3) having edge portions (4) at their base portions thereof and side surfaces (10) at the base portion thereof,
   - thin portions (5) having flexibility for connecting the thick portions to one another,
   - the side surface (10) of the base portion of the thick portion (3) and the thin portion being formed to have an angle θ between 100 degrees and 130 degrees,
   - the reverse sides of the thick portion and the thin portion being formed along a same plane, and
   - a side end thin portion (7) having flexibility and connected to the outside edge portion of one of the thick portions (3A and 3B) located at the side ends thereof,
   - the side end thin portion (7) being formed relatively thick at a base portion (8) thereof and gradually thinner from the base portion (8) to a tip end (9) thereof, and a thick cover (37) formed in a channel shape in cross section to fit over a thick portion (3) which further increases a thickness of a thick portion by covering an entirety of the thick portion.

2. The bendable ornamental panel as claimed in claim 1, further comprising a lustrous tape member (35) attached to at least one thin portion.

3. A bendable ornamental panel attachable to a base member, said panel comprising:
   - a plurality of thick portions (3) having edge portions (4) at their base portions thereof and side surfaces (10) at the base portion thereof,
   - thin portions (5) having flexibility for connecting the thick portions to one another,
   - the side surface (10) of the base portion of the thick portion (3) and the thin portion being formed to have an angle θ between 100 degrees and 130 degrees,
   - the reverse sides of the thick portion and the thin portion being formed along a same plane, and
   - a side end thin portion (7) having flexibility and connected to the outside edge portion of one of the thick portions (3A and 3B) located at the side ends thereof,
   - the side end thin portion (7) being formed relatively thick at a base portion (8) thereof and gradually thinner from the base portion (8) to a tip end (9) thereof,
   - the side end thin portion (7) has a tapered reverse side which is gradually thin from the base portion (8) to the tip end portion (9), and
   - a thick cover (37) formed in a channel shape in cross section to fit over a thick portion (3) which further increases a thickness of a thick portion by covering an entirety of the thick portion.

4. The bendable ornamental panel as claimed in claim 3, further comprising a lustrous tape member (35) attached to at least one thin portion.

* * * * *